US012089142B2

(12) United States Patent
El Ferkouss et al.

(10) Patent No.: US 12,089,142 B2
(45) Date of Patent: Sep. 10, 2024

(54) MAINTAINING RELIABLE CONNECTION BETWEEN AN ACCESS POINT AND A CLIENT DEVICE

(71) Applicant: Hewlett Packard Enterprise Development LP, Houston, TX (US)

(72) Inventors: Omar El Ferkouss, St. Laurent (CA); Aidan Doyle, Santa Clara, CA (US); Karthik Srinivasa Murthy, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 433 days.

(21) Appl. No.: 17/482,606

(22) Filed: Sep. 23, 2021

(65) Prior Publication Data
US 2023/0092764 A1 Mar. 23, 2023

(51) Int. Cl.
| H04W 4/00 | (2018.01) |
| H04W 24/02 | (2009.01) |
| H04W 48/16 | (2009.01) |
| H04W 76/19 | (2018.01) |
| H04W 76/34 | (2018.01) |
| H04W 84/12 | (2009.01) |

(52) U.S. Cl.
CPC .......... *H04W 48/16* (2013.01); *H04W 24/02* (2013.01); *H04W 76/19* (2018.02); *H04W 76/34* (2018.02); *H04W 84/12* (2013.01)

(58) Field of Classification Search
CPC ..... H04W 48/16; H04W 24/02; H04W 84/12; H04W 76/19; H04W 76/34

USPC .......................................................... 370/329
See application file for complete search history.

(56) References Cited

U.S. PATENT DOCUMENTS

| 9,066,251 B2 | 6/2015 | Madan et al. |
| 9,204,385 B2 | 12/2015 | Amini et al. |
| 9,232,566 B2 | 1/2016 | Amini et al. |
| 9,661,515 B2 | 5/2017 | Lord et al. |
| 9,736,703 B2 | 8/2017 | Goldsmith et al. |
| 10,142,209 B2 | 11/2018 | Adams et al. |
| 10,631,305 B2 | 4/2020 | Desai et al. |

(Continued)

FOREIGN PATENT DOCUMENTS

WO WO-2016011337 1/2016

*Primary Examiner* — Temica M Beamer
(74) *Attorney, Agent, or Firm* — Hewlett Packard Enterprise Patent Department (57) ABSTRACT

Examples described herein relate to maintaining a reliable connection between a client device and an access point (AP). Based on the data frames exchanged between the AP and a client device of a plurality of client devices communicatively coupled to the AP after the client device is connected to the AP, the AP may determine whether a client device is experiencing performance issues with respect to a wireless communication feature. In response to determining that the client device is experiencing performance issues with respect to the wireless communication feature, the AP may disable the wireless communication feature for the client device. Further, the AP may continue to exchange data frames with the client device without offering the wireless communication feature. Further, the AP continues to offer the wireless communication feature to another client device of a plurality of client devices not facing the performance issue related to the wireless communication feature.

20 Claims, 5 Drawing Sheets

(56) References Cited

U.S. PATENT DOCUMENTS

| | | |
|---|---|---|
| 2016/0065466 A1 | 3/2016 | Abraham et al. |
| 2021/0006348 A1* | 1/2021 | Vlachou ............... H04L 1/0015 |
| 2022/0286262 A1* | 9/2022 | Tokgoz ............... H04W 72/541 |
| 2022/0393746 A1* | 12/2022 | Zhou .................... H04W 76/19 |

* cited by examiner

MAINTAINING RELIABLE CONNECTION BETWEEN AN ACCESS POINT AND A CLIENT DEVICE

BACKGROUND

A Wireless Local Area Network (WLAN) may include a variety of network devices, such as access points (APs) and controllers, which perform different networking operations, such as network access, authentication, and routing network traffic to provide connectivity to client devices. In the WLAN, for client devices to enable communication via an access point (AP), the client devices need to be connected to the AP. Typically, to get successfully connected to the AP, the client devices undergo a connection process compliant to the IEEE 802.11 standards. At times, some client devices, even after establishing a successful connection with the AP, face issues in communicating through the AP or may not be able to support certain wireless connectivity features that are offered by the AP.

BRIEF DESCRIPTION OF THE DRAWINGS

One or more examples in the present disclosure are described in detail with reference to the following figures. The figures are provided for purposes of illustration only and merely depict typical or examples.

The figures are not exhaustive and do not limit the present disclosure to the precise form disclosed.

DETAILED DESCRIPTION

In WLAN, APs act as communication bridges between wireless devices (also referred to as client devices) and other devices in a network to enable communication of data traffic. A client device should be connected to an AP for the client device to perform any communication via the AP. Once connected to the AP, the wireless device can send data traffic to another device through the AP.

Also, due to the introduction of newer WLAN standards such as the IEEE 802.11ax (also known as Wi-Fi 6), APs should be backward compatible to support older standards such as from the IEEE 802.11a to the IEEE 802.11ac. Typically, wireless issues related to interoperability are very common in wireless deployments. Sometimes, due to interoperability issues, some client devices may behave abnormally even after being connected to an AP impacting the overall performance of the AP. For instance, the interoperability-related issues for a given client device may cause performance degradation of the given client device itself. In some cases, the interoperability-related issues may also impact other client devices associated with the AP to which the given client device is connected. Further, in some instances, the interoperability-related issues for the given client device may as well impact other APs operating in the same channel as that of the AP to which the given client is associated. To address those issues, one frequently used mitigation method is to selectively disable some wireless communication features, such as, support for orthogonal frequency-division multiple access (OFDMA), Multi-user multiple-input multiple-output (MU-MIMO), or aggregated media access control (MAC) protocol data unit (AMPDU), at the one or more APs. However, such disabling of features for the APS can impact the performance of all other client devices that are running without issues.

In the present disclosure, example techniques are presented to optimize the performance of a client device connected to the AP without impacting other client devices associated with the same AP. The example techniques presented herein may be performed after a client device is connected to the AP, and the AP and the client device have exchanged data frames therebetween. In some examples, based on the data frames exchanged between the AP and the client device after the client device is connected to the AP, the AP may perform a check to determine whether a client device is experiencing performance issues with respect to a wireless communication feature. The wireless communication feature may be one or more of, but not limited to, OFDMA, MU-MIMO, frame aggregation techniques such as AMPDU and/or aggregated MAC service data unit (AMSDU), high throughput (HT), very high throughput (VHT), high efficiency (HE), Wi-Fi multimedia (WMM), and/or legacy rates. For example, based on the data frames exchanged between the AP and the client device, the AP may detect that the client device and the AP could not establish an AMPDU session, there are abnormal retries of OFDMA packets or the like. If the AP determines that the client device is experiencing performance issues with respect to the wireless communication feature, the AP may disable the wireless communication feature for the client device. Further, the AP may continue to exchange data frames with the client device without offering the wireless communication feature, whereas the AP continues to offer the wireless communication feature to another client device of a plurality of client devices not facing the performance issue related to the wireless communication feature.

As will be appreciated, the AP disables the wireless communication feature only for the client device(s) for which the wireless communication feature causes performance issues. In this manner, the performance of the client device may be improved, whereas, for the other well-performing client devices, the AP may continue to offer the wireless communication feature so that the well-performing client devices can benefit from the wireless communication feature. Managing the wireless communication feature in this manner may avoid the impact of faulty client devices on the well-performing client devices. Further, as the wireless communication feature is disabled only for the client device(s) for which the wireless communication feature causes performance issues, additional configuration changes that can impact a large number of the well-performing client devices may be avoided. Moreover, in some examples, the AP may enable the wireless communication feature after the elapse of a certain duration. So that if the performance of the client device has improved, the client device can start using the wireless communication feature.

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Figure 1:
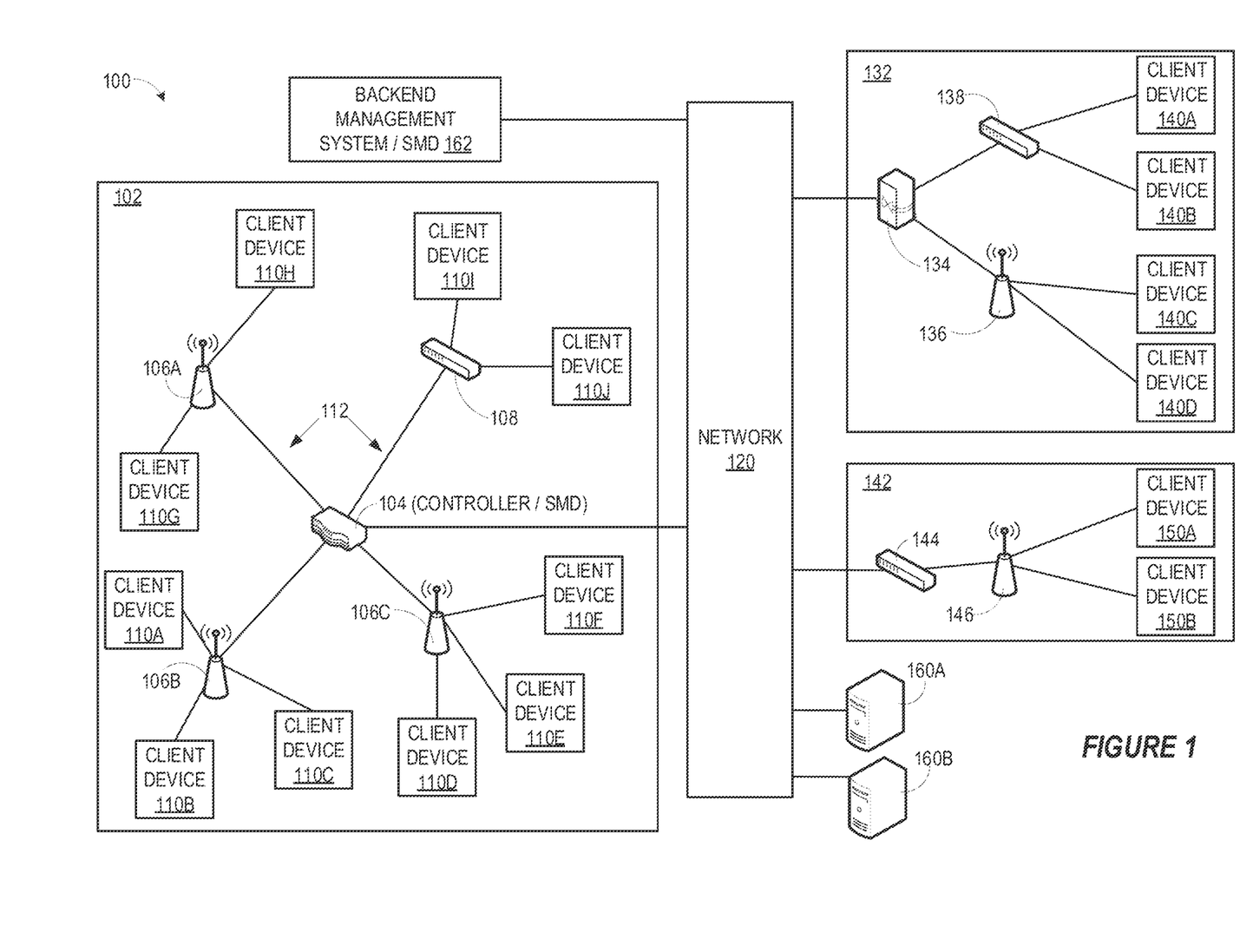
FIG. 1 illustrates an example system in which various of the examples presented herein may be implemented.

Before describing examples of the disclosed systems and methods in detail, it is useful to describe an example network installation with which these systems and methods might be implemented in various applications. FIG. 1 illustrates one example of a system 100 in which various of the examples presented herein may be implemented. The system 100 may be a network configuration that may be implemented for an organization, such as a business, educational institution, governmental entity, healthcare facility, or other organization. This diagram illustrates an example of a configuration implemented with an organization having multiple users (or at least multiple client devices 110) and possibly one or more physical or geographical sites, for example, a primary site 102, and/or remote sites 132, 142. The primary site 102 and/or the remote sites 132, 142 are in communication with a network 120.

The primary site 102 may include a primary network, which can be, for example, an office network, home network, or other network installation. The primary site 102 may be a private network, such as a network that may include security and access controls to restrict access to authorized users of the private network. Authorized users may include, for example, employees of a company at the primary site 102, residents of a house, customers at a business, and so on. In the illustrated example, the primary site 102 is shown to include a controller 104 in communication with the network 120. The controller 104 may provide communication with the network 120 for the primary site 102, though it may not be the only point of communication with the network 120 for the primary site 102. A single controller 104 is illustrated, though the primary site 102 may include multiple controllers and/or multiple communication points with network 120. In some examples, the controller 104 may communicate with the network 120 through a router (not shown). In other implementations, the controller 104 may provide router functionality to the devices in the primary site 102.

The controller 104 may be operable to configure and manage network devices, such as at the primary site 102, and may also manage network devices at the remote sites 132, 142. The controller 104 may be operable to configure and/or manage switches, routers, APs, and/or client devices connected to a network. The controller 104 may itself be, or provide the functionality of, an AP. In some examples, the controller 104 may be in communication with one or more switches 108 and/or wireless APs 106A-106C. The switches 108 and the wireless APs 106A-106C may provide network connectivity to various client devices 110A-110J. Using a connection to the switch 108 or one or more of the AP 106A-106C, one or more of the client devices 110A-110J may access network resources, including other devices on the (primary site 102) network and the network 120. Examples of client devices 110A-110J may include, but are not limited to, desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, Internet of Things (IOT) devices, and the like.

Within the primary site 102, the switch 108 is included as one example of a point of access to the network established in primary site 102 for wired client devices 110I and 110J, for example. The client devices 110I and 110J may connect to the switch 108 and through the switch 108, may be able to access other devices within the system 100. The client devices 110I and 110J may also be able to access the network 120, through the switch 108. The client devices 110I and 110J may communicate with the switch 108 over a wired connection 112. In the illustrated example, the switch 108 may communicate with the controller 104 over a wired connection 112, though this connection may also be wireless, in some examples.

The wireless APs 106A-106C are included as another example of a point of access to the network established in primary site 102 for client devices 110A-110H. Each of APs 106A-106C may be a combination of hardware, software, and/or firmware that is configured to provide wireless network connectivity to wireless client devices 110A-110H. In the illustrated example, the APs 106A-106C can be managed and configured by the controller 104. The APs 106A-106C may communicate with the controller 104 and the network 120 over connections 112, which may be either wired or wireless interfaces. In some examples, one or more of the APs 106A-106C or other APs (e.g., APs 136, 146-described later) may host one or more virtual access points (VAP) to which respective client device can connect. A VAP may include a driver and client device optimizer through which the VAP can communicate with a client device and the controller, respectively.

The system 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, the remote site 132 may utilize a connection over a different network, e.g., the network 120. The remote site 132 such as the one illustrated in FIG. 1 may be, for example, a satellite office, another floor, or suite in a building, and so on. The remote site 132 may include a gateway device 134 for communicating with the network 120. The gateway device 134 may be a router, a digital-to-analog modem, a cable modem, a Digital Subscriber Line (DSL) modem, or some other network device configured to communicate to the network 120. The remote site 132 may also include a switch 138 and/or an AP 136 in communication with the gateway device 134 over either wired or wireless connections. The switch 138 and the AP 136 may provide connectivity to the network for various client devices 140A, 140B, 140C, and 140D (hereinafter collectively referred to as client devices 140A-140D).

In various examples described herein, the remote site 132 may be in direct communication with the primary site 102, such that client devices 140A-140D at the remote site 132 access the network resources at the primary site 102 as if these client devices 140A-140D were located at the primary site 102. In such examples, the remote site 132 may be managed by the controller 104 at the primary site 102, and the controller 104 may provide the necessary connectivity, security, and accessibility that enable the remote site 132's communication with the primary site 102. Once connected to the primary site 102, the remote site 132 may function as a part of a private network provided by the primary site 102.

In various examples, the system 100 may include one or more smaller remote sites 142, comprising a gateway device 144 for communicating with the network 120 and a wireless AP 146, by which various client devices 150A, 150B access the network 120. Such a remote site 142 may represent, for example, an individual employee's home or a temporary remote office. The remote site 142 may also be in communication with the primary site 102, such that the client devices 150A, 150B at remote site 142 access the network resources at the primary site 102 as if these client devices 150A, 150B were located at the primary site 102. The remote site 142 may be managed by the controller 104 at the primary site 102 to make this transparency possible. Once connected to the primary site 102, the remote site 142 may function as a part of a private network provided by the primary site 102.

Further, in some examples, the system 100 may include a backend management system 162 communicatively coupled to the network 120. The backend management system 162 may be a computing system, for example, a computer, a controller, a router, a switch, a server, or a storage system hosted on a public cloud, a private cloud, or a hybrid cloud. In certain examples, the backend management system 162 may be any suitable device having a hardware processing resource (not shown), such as one or more central processing units (CPUs), semiconductor-based microprocessors, and/or other hardware devices suitable for retrieval and execution of instructions stored in a machine-readable storage medium (not shown). In some examples, the controller 104 or the backend management system 162, individually or collectively, are also referred to as a supervisory management device for one or more of the APs 106A-106C, 136, or 146. For illustration purposes, the controller 104 and the backend management system 162 are also labeled as supervisory management devices (SMD) in FIG. 1.

The network 120 may be a public or private network, such as the Internet, or another communication network to allow connectivity among the various sites 102, 132 to 142 as well as access to content servers 160A, 160B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the system 100 but that facilitate communication between the various parts of the system 100, and between the system 100 and other network-connected entities. The content servers 160A, 160B may be part of the network 120 or disposed outside of the network 120. The content servers 160A, 160B may include various providers of multimedia downloadable and/or streaming content, including audio, video, graphical, and/or text content, or any combination thereof. Examples of content servers 160A, 160B may include, but are not limited to, web servers, streaming radio and video providers, and cable and satellite television providers. The client devices 110A-110J, 140A-140D, or 150A-150B may request and access the multimedia content provided by the content servers 160A, 160B.

In the system 100, sometimes, due to interoperability issues, one or more of the client devices 110A-110J, 140A-140D, or 150A-150B, may behave abnormally even after being connected to respective APs. In the description hereinafter, several examples are described with reference to the client device 110B, it should be understood that the techniques may apply to other client devices as well. In some examples, the AP 106B may perform a check to determine whether the client device 110B is experiencing performance issues with respect to a wireless communication feature such as, but not limited to, OFDMA, MU-MIMO, AMPDU, AMSDU, HT, VHT, HE, WMM, and/or legacy rates. For example, based on the data frames exchanged between the AP 106B and the client device 110B, the AP 106B may detect that the client device 110B and the AP 106B could not establish an AMPDU session, there are abnormal retries of OFDMA packets, or the like. If the AP 106B determines that the client device 110B is experiencing performance issues with respect to the wireless communication feature, the AP 106B may disable the wireless communication feature for the client device 110B. Further, the AP 106B may continue to exchange data frames with the client device 110B without offering the wireless communication feature to the client device 110B. On the other hand, the AP 106B may continue to offer the wireless communication feature to other client devices, for example, the client devices 110A and 110C that are not facing the performance issue related to the wireless communication feature.

Further, in some examples, upon determining that the client device 110B is experiencing performance issues with respect to the wireless communication feature, the AP 106B may trigger an alert to the supervisory management device. In one example, the controller 104 may act as the supervisory management device for the AP 106B, and the AP 106B may send the alert to the controller 104. In another example, the backend management system 162 may be configured to act as the supervisory management device for the AP 106B, and the AP 106B may send the alert to the backend management system 162. Once the supervisory management device receives the alert, the supervisory management device may transmit a wireless action to the AP 106B to overcome the performance issues faced by the client device 110B. Upon receiving the wireless action from the supervisory management device, the AP 106B may disable the wireless communication feature for the client device 110B and may continue to exchange data frames with the client device 110B without offering the wireless communication feature, however, continue to offer the wireless communication feature to other client devices, for example, the client device 110A and 110C that are not facing the performance issue related to the wireless communication feature. In some examples, the wireless action received from the supervisory management device may have a predefined lifetime for which the wireless action remains active. Upon expiry of the wireless action, the AP 106B may enable the wireless communication feature for the client device 110B.

In some examples, the APs 106A-106C may be arranged in a mesh network in which the APs 106A-106C may advertise the same SSID. This enables client devices to roam seamlessly through the mesh. Furthermore, in some examples, once an alert is detected by the supervisory management device for the client device 110B, the supervisory management device may monitor other APs (e.g., the APs 106A, 106C) operating on the same channel to determine if a similar alert is raised from another one or more of the APs 106A, 106C. The supervisory management device stores an identifier (such as a MAC address of the client device facing the performance issue) and then pre-positions wireless actions with instructions to customize communications with that client device throughout the mesh. For example, the supervisory management device may decide to publish the same wireless action to the APs 106A, 106C advertising the same SSID as advertised by the AP to which the client device 110B is connected. Therefore, if the client device 110B roams to a different AP such as the AP 106A, the new AP 106A will apply the wireless action once the client device 110B is associated with the new AP 106A to optimize the performance of the client device 110B. In that way, communications are optimized for the client device in advance, contributing to seamless service. This assumes that the MAC address used by the client device 110B to associate to the AP 106B is the same as it used to associate with the AP 106B. Typically, the client devices use the same MAC address for association across an SSID even when MAC randomization is enabled. Therefore, in some examples, the client devices may keep the same MAC address when associating to the same SSID on different APs. If the client device 110B uses a different MAC address after each association, the respective AP may generate alert for each new MAC address used by the client device 110B.

Figure 2:
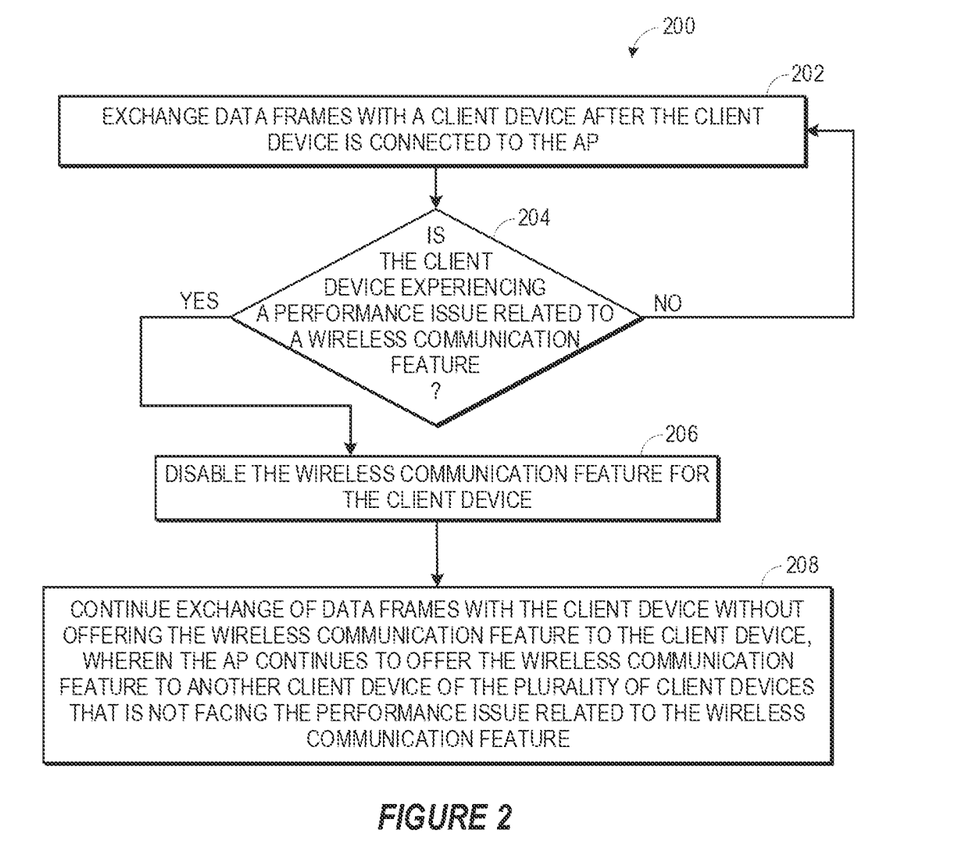
FIG. 2 depicts a flowchart of an example method for maintaining a reliable connection between an AP and a client device.
Figure 3:
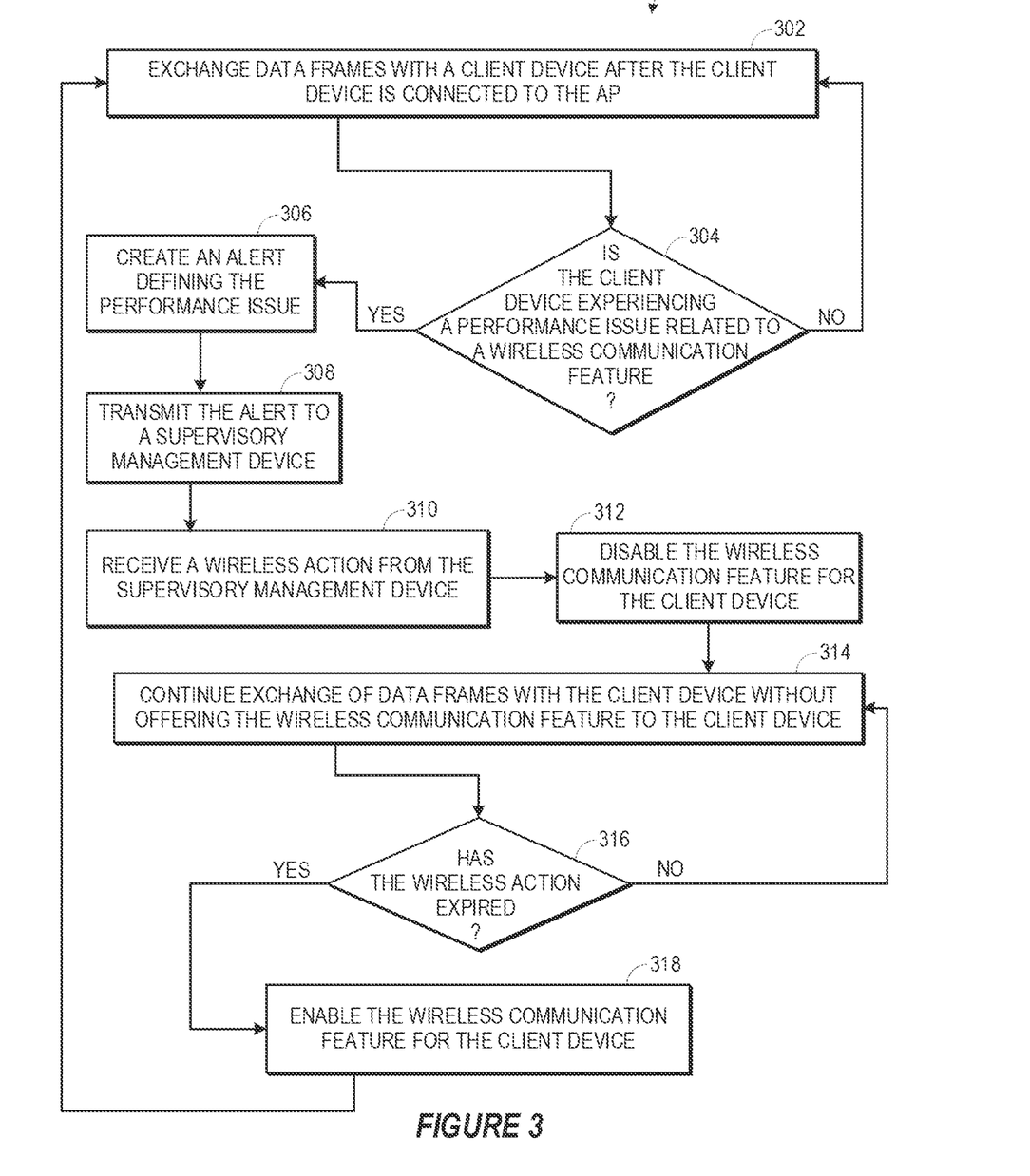
FIG. 3 depicts a flowchart of another example method for maintaining a reliable connection between an AP and a client device.
Figure 4:
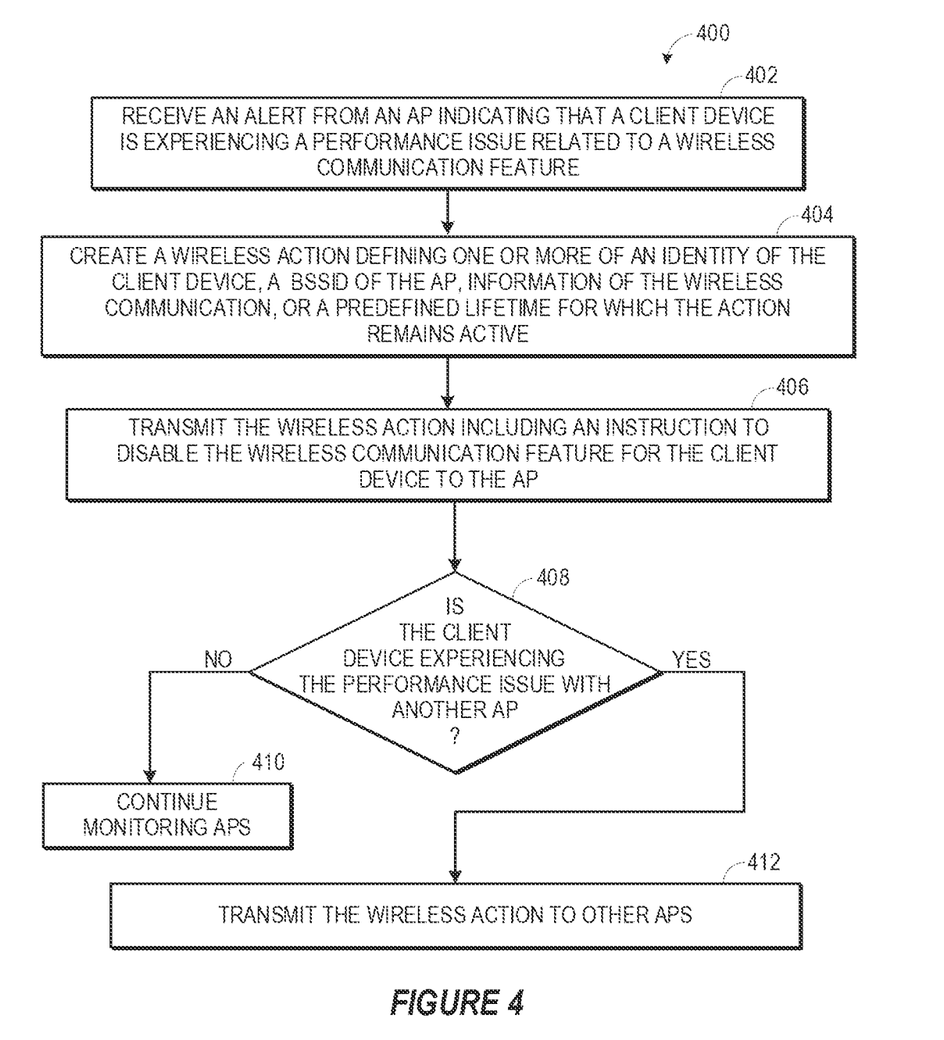
FIG. 4 depicts a flowchart of an example method for aiding in maintaining a reliable connection between an AP and a client device.

Additional details of operations performed by an AP (e.g., the AP 106B) and/or the respective supervisory device to maintain a reliable connection with a client device (e.g., the client device 110B) are described in conjunction with methods presented in FIGS. 2-4.

Referring now to FIG. 2, a flowchart of an example method 200 for maintaining a reliable connection between an AP and a client device is presented. Although the steps in FIG. 2 are shown in an order, the order of steps shown in FIG. 2 should not be construed as the only order for the steps. The steps may be performed at any time, in any order. Additionally, the steps may be repeated or omitted as needed.

In some examples, the steps may be performed by any suitable device, such as an AP, a controller, a backend management system, a switch, a computing device, a client device, a network infrastructure device, etc. In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium (not shown). In some examples, the steps shown in FIG. 2 may be performed by an AP, for example, any of the APs 106A-106C, 136, or 146, shown in the system 100 of FIG. 1. The processing resource may fetch, decode, and execute instructions, to maintain a reliable connection between an AP and a client device. As an alternative or in addition to retrieving and executing instructions, the processing resource may include one or more electronic circuits that include electronic components for performing the functionality of one or more instructions, such as a field-programmable gate array (FPGA), application-specific integrated circuit (ASIC), or other electronic circuits.

A machine-readable storage medium, such as machine-readable storage medium, may be any electronic, magnetic, optical, or other physical storage device that contains or stores executable instructions. Thus, a machine-readable storage medium may be, for example, Random Access Memory (RAM), non-volatile RAM (NVRAM), an Electrically Erasable Programmable Read-Only Memory (EEPROM), a storage device, an optical disc, and the like. In some embodiments, a machine-readable storage medium may be a non-transitory storage medium, where the term "non-transitory" does not encompass transitory propagating signals.

In accordance with some examples presented herein, at step 202, the AP may exchange data frames with a client device after the client device is connected to the AP. The exchange of the data frames at step 202 may be representative of any communication between the AP and the client device after the client device is successfully connected to the AP. For example, the data frames may include data frames originating from the client device and directed to any other client device via the AP. In another example, the data frames may include data frames received from the other client device and are directed to the client device via the AP.

Further, at step 204, the AP may perform a check to determine whether the client device is experiencing a performance issue related to a wireless communication feature. The term "performance issue" may refer to an inability of the client device to, either fully or partially, support the wireless communication feature such as, but not limited to, OFDMA, MU-MIMO, AMPDU. AMSDU, HT, VHT, HE, WMM, and/or legacy rates. Based on data frames exchanged between the client device and the AP, the AP may determine whether the client device is experiencing a performance issue related to the wireless communication feature. For example, the AP may analyze the data frames exchanged between the client device and the AP to determine parameters such as one or more of number retries of the same data frames, absence of certain response/feedback from the client device, session failures, etc. The AP may then compare one or more of these parameters with respective threshold values or apply respective decision criteria to the parameters to determine if the client device is facing any performance issue. In one example, if the AP is not able to establish an AMPDU session with the client device, the AP may determine that the client device is facing issues with the wireless communication feature such as the AMPDU. In some examples, if the AP makes several retries for OFDMA packets and the client device is not responsive to the OFDMA packets, the AP may determine that the client device is facing issues with the wireless communication feature such as the OFDMA. Further, in a case of a wireless communication feature such as MU-MIMO, the AP utilizes transmit beamforming (TxBF) to determine the relative positions of all of its associated client devices and selects a group of clients to transmit to simultaneously. A client device may not support an appropriate feedback mechanism for TxBF if the client device does not have the hardware and/or drivers that enable this TxBF feedback. In such a case, the AP may not receive the TxBF feedback from the client device and the AP may determine that the client device is experiencing performance issues with respect to the wireless communication feature such as MU-MIMO. Likewise, the AP may be configured to determine if the client device is facing performance issues with respect to other types of wireless communication features as well.

At step 204, if the AP determines that the client device is not experiencing ('No' at step 204) the performance issue related to the wireless communication feature, the AP may continue to exchange data frames with the client device with all supported features. However, at step 204, if the AP determines that the client device is experiencing ('Yes' at step 204) the performance issue related to the wireless communication feature, at step 206, the AP may disable the wireless communication feature for the client device. It may be noted that, at step 206, the AP disables the wireless communication feature only for the client device that identified as experiencing the performance issue with respect to the wireless communication feature. Whereas, for the client device that is not facing the performance issue with respect to the wireless communication feature, the wireless communication feature will not be disabled.

Typically, when a client device associates to the AP, the AP builds a list of wireless communication features that the client device supports (for instance, OFDMA, MU-MIMO, frame aggregation techniques such as AMPDU, HT, VHT, HE, WMM, and/or legacy rates, etc.). Such a list of supported features may be updated after the association depending on the exchange of data frames with the client device. For instance, upon successful negotiation of an AMPDU session with the client device, the AP may add AMPDU to the list of supported features. Whenever a performance issue is detected, the AP decides to update the list of supported features. For instance, if the performance issue is caused by the AMPDU, the AP may end the AMPDU session for the client and reject any AMPDU request coming from the client. In some examples, disabling the wireless communication feature for the client device, at step 206, may include removing the entry corresponding to the wireless communication feature from the list of supported features. For instance, upon determining that the performance issue is caused by AMPDU, the AP may remove the entry corresponding to the AMPDU from the list. In some examples, the AP may store the list of wireless communication features for the client device in the form of a database. In some other examples, the AP may send alerts to a supervisory communication device indicating the wireless communication features causing performance issues for the client device. Based on the alerts, the supervisory communication device may store a log including the information about the client devices and respective wireless communication features causing the performance issues.

Further, at step 208, the AP may continue the exchange of data frames with the client device without offering the wireless communication feature to the client device. Also, the AP may continue to offer the wireless communication feature to another client device of the plurality of client devices that is not facing the performance issue related to the wireless communication feature.

Referring now to FIG. 3, a flowchart of an example method 300 for maintaining a reliable connection between an AP and a client device is presented. In some examples, method steps shown in FIG. 3 may be performed by any suitable device, such as an AP, a supervisory management device such as a controller or a backend management system, switch, computing device, a client device, network infrastructure device, etc. In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium (not shown). In some examples, the steps shown in FIG. 3 may be performed by an AP, for example, any of the APs 106A-106C, 136, or 146, shown in the system 100 of FIG. 1. Further, the method 300 of FIG. 3 may include certain steps that are similar, in one or more aspects, to those already described in FIG. 2, the description of which is not repeated herein.

Although the steps in FIG. 3 are shown in an order, the order of steps shown in FIG. 3 should not be construed as the only order for the steps. The steps may be performed at any time, in any order. Additionally, the steps may be repeated or omitted as needed. A processing resource may fetch, decode, and execute instructions, to maintain a reliable connection between an AP and a client device. The instructions may be stored in a machine-readable storage medium. As an alternative or in addition to retrieving and executing instructions, the processing resource may include one or more electronic circuits that include electronic components for performing the functionality of one or more instructions, such as a field-programmable gate array (FPGA), application-specific integrated circuit (ASIC), or other electronic circuits.

In accordance with some examples presented herein, at step 302, the AP may exchange data frames with a client device after the client device is connected to the AP. The exchange of the data frames at step 302 may be representative of any communication between the AP and the client device after the client device is successfully connected to the AP. Further, at step 304, the AP may perform a check to determine whether the client device is experiencing a performance issue related to a wireless communication feature, such as, but not limited to, OFDMA, MU-MIMO, AMPDU, AMSDU, HT, VHT, HE, WMM, and/or legacy rates, based on data frames exchanged between the client device and the AP. At step 304, if the AP determines that the client device is not experiencing the performance issue related to the wireless communication feature, the AP may continue to exchange data frames with the client device with all supported features as indicated by step 302.

However, at step 304, if the AP determines that the client device is experiencing the performance issue related to the wireless communication feature, at step 306, the AP may create an alert defining the performance issue. In some examples, the alert may include information, such as, but not limited to, an identity (e.g., a MAC address) of the client device, a basic service set identifier (BSSID) of the AP, and a description (e.g., name or identifier) of the wireless communication feature causing the performance issue. At step 308, the AP may transmit the alert to a supervisory management device. In one example, a controller may be configured to act as the supervisory management device and the AP may transmit the alert to the controller. In another example, a backend management system may be configured to act as the supervisory management device and the AP may transmit the alert to the backend management system. Based on the alert, the supervisory management device may generate a wireless action for the client device identified from the alert (described in greater detail in the description later) instructing the AP to resolve the performance issue faced by the client device. The wireless action may be a time-bound wireless action that has a predetermined lifetime for which the wireless action can be kept active.

Further, at step 310, the AP may receive the wireless action from the supervisory management device. The AP may identify the client device and the wireless communication feature from the wireless action. Accordingly, at step 312, the AP may disable the wireless communication feature for the client device. In some examples, disabling the wireless communication feature for the client device, at step 312, may include removing the entry corresponding to the wireless communication feature from the list of supported features. For instance, upon determining that the performance issue is caused by AMPDU, the AP may remove the entry corresponding to the AMPDU from the list of supported features. Furthermore, at step 314, the AP may continue the exchange of data frames with the client device without offering the wireless communication feature. Whereas the AP may continue to offer the wireless communication feature to other client devices that are not facing the performance issue related to the wireless communication feature.

At step 316, the AP may perform a check to determine whether the wireless action has expired. The AP may perform such a check based on the lifetime of the wireless action, information (e.g., the predetermined lifetime) of which may be included in the wireless action received from the supervisory management device. In particular, the AP may perform a check to determine whether a duration equal to the predetermined lifetime of the wireless action has elapsed after the wireless action is disabled. At step 316, if it is determined that the duration equal to the predetermined lifetime has not elapsed after the wireless action is disabled, the AP may determine that the wireless action is not expired. However, at step 316, if it is determined that the duration equal to the predetermined lifetime has elapsed after the wireless action is disabled, the AP may determine that the wireless action is expired.

If the AP determines that the wireless action is not expired ('No' at step 316), the AP may continue the exchange of data frames (at step 314) with the client device without offering the wireless communication feature to the client device, while continuing to offer the wireless communication feature to other client devices are not facing the performance issue related to the wireless communication feature. However, if the AP determines that the wireless action is expired ('Yes' at step 316), the AP, at step 318, may enable the wireless communication feature for the client device. In some examples, enabling of the wireless communication feature for the client device, at step 318, may include creating or updating an entry corresponding to the wireless communication feature in the list of supported features. For instance, upon determining that the wireless action corresponding to AMPDU is expired, the AP may create an entry corresponding to the AMPDU in the list of supported features. Also, AP may re-start negotiating AMPDU sessions and respond to any AMPDU request from the client device. Once the wireless communication feature is enabled, the AP may again begin exchanging (at step 302) the data frames with the client device with the wireless communication feature enabled for the client device.

Turning now to FIG. 4, a flowchart of an example method 400 for aiding in maintaining a reliable connection between an AP and a client device is presented. Although the steps in FIG. 4 are shown in an order, the order of steps shown in FIG. 4 should not be construed as the only order for the steps. The steps may be performed at any time, in any order. Additionally, the steps may be repeated or omitted as needed. For illustration purposes, the example method 400 is described as being performed by a supervisory management device. In one example, a controller such as the controller 104 of FIG. 1 may be configured to act as the supervisory management device. In another example, a backend management system such as the backend management system 162 of FIG. 1 may be configured to act as the supervisory management device. In some examples, method steps shown in FIG. 4 may be performed by any suitable device, such as an AP, network infrastructure device, etc. In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium.

At step 402, the supervisory management device may receive an alert from the AP indicating that a client device of the plurality of client devices is facing a performance issue related to a wireless communication feature. The alert may include certain information about the AP, the client device, and the wireless communication feature causing the performance issue at the client device. For example, the alert may include a BSSID of the AP, a MAC address of the client device, and a name/identifier of the wireless communication feature. Based on the information contained in the alert, the supervisory management device may identify the client device (in particular, using the MAC address contained in the alert) and the wireless communication feature. The supervisory management device may manage a plurality of APs in a system. Accordingly, in some examples, the supervisory management device may store a log of one or more such alerts received from various APs. In particular, in some examples, the supervisory management device may store, in the log, information about the client devices (e.g., the MAC addresses of the client devices) and the respective wireless communication feature(s) causing performance issues as reported by one or more APs in the system. The log may be stored as a database in the supervisory management device.

Further, in some examples, at block 404, the supervisory management device may create a wireless action for the client device. The wireless action may include one or more of an identity of the client device, the BSSID of the AP, information of the wireless communication, or a predefined lifetime for which the wireless action remains active. In particular, the identity of the client device, the BSSID of the AP, and information of the wireless communication, may be determined by the supervisory management device based on the information contained in the alert received from the AP. In certain other examples, the predefined lifetime may be customizable and can be dynamically updated by an administrator and/or dynamically calculated by the supervisory management device. Furthermore, in some examples, at step 406, the supervisory management device may transmit, the wireless action to the AP from which the supervisory management device received the alert. In particular, the wireless action may include instructions for the AP to disable the wireless communication feature for the client device.

Moreover, in some examples, at step 408, the supervisory management device may perform a check to determine whether the client device is experiencing the performance issue related to the wireless communication feature with another AP deployed in the system. The another AP may be operating on the same channel and advertise the same SSID that is being advertised by the AP to which the wireless action is sent at step 406. As previously noted, the supervisory management device may manage a plurality of APs in the system and may store the log of one or more alerts received from various APs. In particular, in some examples, the supervisory management device may have stored, in the log, information about the client devices and the respective wireless communication feature causing performance issues as reported by one or more APs in the system. The supervisory management device may perform a lookup in the log to determine if any other AP has reported an alert for the client device with respect to the same wireless communication feature. If the supervisory management device determines that any other AP has reported the alert for the client device with respect to the same wireless communication feature, it may be determined by the supervisory management device that the client device is also experiencing the performance issue related to the wireless communication feature with another AP deployed in the system. However, if the supervisory management device determines that no AP has reported an alert for the client device with respect to the same wireless communication feature, it may be determined by the supervisory management device that the client device is not experiencing the performance issue related to the wireless communication feature with another AP deployed in the system.

If it is determined that the client device is not experiencing the performance issue ('No' at step 408) related to the wireless communication feature with another AP, the supervisory management device, at step 410, may continue to monitor APs for any alerts. However, if it is determined that the client device is experiencing the performance issue ('Yes' at step 408), the supervisory management device, at step 412, may transmit the wireless action to other APs advertising the same SSID as advertised by the AP from which the alert is received at step 402. In response to receiving the wireless action from the supervisory management device, the other APs may also disable the wireless communication feature for the client device, while continuing to offer the wireless communication feature to other client devices not facing performance issues with respect to the wireless communication feature. In some examples, the supervisory management device may transmit the wireless action to other APs advertising the same SSID as advertised by the AP from which the alert is received without performing the check at step 408. For example, the supervisory management device may transmit the wireless action to other APs advertising the same SSID concurrently at step 406, or after the execution of step 406.

Figure 5:
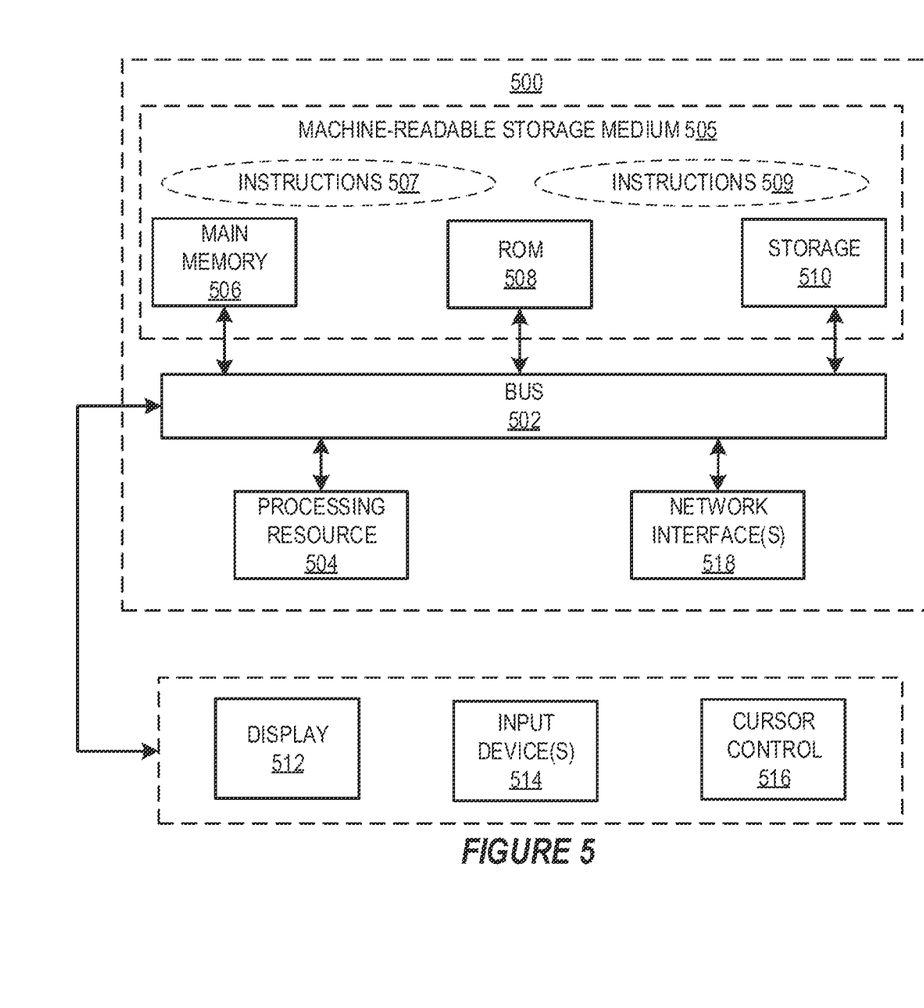
FIG. 5 depicts a block diagram of an example computing system in which various of the examples described herein may be implemented.

FIG. 5 depicts a block diagram of an example computing system 500 in which various of the examples described herein may be implemented. In some examples, the computing system 500 may be representative of an AP (e.g., any of the APs 106A-106C, 136, 146 of FIG. 1) and can perform various operations performed by the AP. In certain other examples, the computing system 500 may be representative of a supervisory management device (e.g., a controller such as the controller 104 or a backend management system such as the backend management system 162 of FIG. 1) and can perform various operations performed by the supervisory management device. The computing system 500 may include a bus 502 or other communication mechanisms for communicating information, a hardware processor, also referred to as processing resource 504, coupled to the bus 502 for processing information. The processing resource 504 may be, for example, one or more general-purpose microprocessors.

The computing system 500 may also include a machine-readable storage medium 505 communicatively coupled to the bus 502. In some examples, the machine-readable storage medium 505 may include a main memory 506, such as a random-access memory (RAM), cache and/or other dynamic storage devices, coupled to the bus 502 for storing information and instructions to be executed by the processing resource 504. The main memory 506 may also be used for storing temporary variables or other intermediate information during the execution of instructions to be executed by the processing resource 504. Such instructions, when stored in storage media accessible to the processing resource 504, render the computing system 500 into a special-purpose machine that is customized to perform the operations specified in the instructions.

The machine-readable storage medium 505 may further include a read-only memory (ROM) 508 or other static storage device coupled to the bus 502 for storing static information and instructions for the processing resource 504. Further, in the machine-readable storage medium 505, a storage device 510, such as a magnetic disk, optical disk, or USB thumb drive (Flash drive), etc., may be provided and coupled to the bus 502 for storing information and instructions.

Further, in some implementations, the computing system 500 may be coupled, via the bus 502, to a display 512, such as a liquid crystal display (LCD) (or touch-sensitive screen), for displaying information to a computer user. In some examples, an input device 514, including alphanumeric and other keys (physical or software generated and displayed on touch-sensitive screen), may be coupled to the bus 502 for communicating information and command selections to the processing resource 504. Also, in some examples, another type of user input device may be a cursor control 516, such as a mouse, a trackball, or cursor direction keys may be connected to the bus 502. The cursor control 516 may communicate direction information and command selections to the processing resource 504 for controlling cursor movement on the display 512. In some other examples, the same direction information and command selections as cursor control may be implemented via receiving touches on a touch screen without a cursor.

In some examples, the computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer-readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an erasable programmable read-only memory (EPROM). It will be further appreciated that hardware components may be comprised of connected logic units, such as gates and flip-flops, and/or may include programmable units, such as programmable gate arrays or processors.

The computing system 500 may implement the techniques described herein using customized hard-wired logic, one or more application-specific integrated circuits (ASICs) or Field Programmable Gate Arrays (FPGAs), firmware and/or program logic which may cause or program the computing system 500 to be a special-purpose machine. According to one example, the techniques herein are performed by the computing system 500 in response to the processing resource 504 executing one or more sequences of one or more instructions contained in the main memory 506. Such instructions may be read into the main memory 506 from another storage medium, such as the storage device 510. Execution of the sequences of instructions contained in the main memory 506 causes the processing resource 504 to perform the method steps described herein. In an alternative example, hard-wired circuitry may be used in place of or in combination with software instructions.

The term "non-transitory media," and similar terms, as used herein refer to any media that store data and/or instructions that cause a machine to operate in a specific fashion. Such non-transitory media may include non-volatile media and/or volatile media. Non-volatile media includes, for example, optical or magnetic disks, such as the storage device 510. Volatile media may include dynamic memory, such as the main memory 506. Common forms of non-transitory media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a programmable read-only memory (PROM), and an EPROM, a FLASH-EPROM, a non-volatile RAM (NVRAM), any other memory chip or cartridge, and networked versions of the same.

Non-transitory media is distinct from but may be used in conjunction with transmission media. Transmission media participates in transferring information between non-transitory media. For example, transmission media may include coaxial cables, copper wire, and/or fiber optics, including the wires that comprise bus 502. Transmission media can also take the form of acoustic or light waves, such as those generated during radio-wave and infra-red data communications.

The computing system 500 also includes a network interface 518 coupled to bus 502. The network interface 518 provides a two-way data communication coupling to one or more network links that are connected to one or more local networks. For example, the network interface 518 may be an integrated services digital network (ISDN) card, cable modem, satellite modem, or a modem to provide a data communication connection to a corresponding type of telephone line. As another example, the network interface 518 may be a local area network (LAN) card to provide a data communication connection to a compatible LAN (or WAN component to communicate with a WAN). Wireless links may also be implemented. In any such implementation, the network interface 518 sends and receives electrical, electromagnetic, or optical signals that carry digital data streams representing various types of information.

A network link typically provides data communication through one or more networks to other data devices. For example, a network link may provide a connection through a local network to a host computer or data equipment operated by an Internet Service Provider (ISP). The ISP in turn provides data communication services through the worldwide packet data communication network now commonly referred to as the "Internet." Local network and the Internet both use electrical, electromagnetic, or optical signals that carry digital data streams. The signals through the various networks and the signals on the network link and through the network interface 518, which carry the digital data to and from the computing system 500, are examples of forms of transmission media.

The computing system 500 can send messages and receive data, including program code, through the network(s), network link and the network interface 518. In the Internet example, a server might transmit a requested code for an application program through the Internet, the ISP, the local network, and the network interface 518. The received code may be executed by the processing resource 504 as it is received, and/or stored in the storage device 510, or other non-volatile storage for later execution.

In some examples, the machine-readable storage medium 505 (e.g., one or more of the main memory 506, the ROM 508, or the storage device 510) may store instructions 507 and/or instructions 509 which when executed by the processing resource 504 may cause the processing resource 504 to execute one or more of the methods described hereinabove. The instructions 507 and/or instructions 509 may be stored on any of the main memory 506, the ROM 508, or the storage device 510. In some examples, the instructions 507 and/or instructions 509 may be distributed across one or more of the main memory 506, the ROM 508, or the storage device 510.

In some examples, the computing system 500 may be an AP and store the instructions 507. The instructions 507 may include instructions which when executed by the processing resource 504 may cause the processing resource 504 to determine that a client device of a plurality of client devices communicatively coupled to the AP is experiencing a performance issue related to a wireless communication feature based on analysis of data frames exchanged between the AP and the client device after the client device is connected to the AP. Further, the instructions 507 may include instructions which when executed by the processing resource 504 may cause the processing resource 504 to disable the wireless communication feature for the client device. Moreover, the instructions 507 may include instructions which when executed by the processing resource 504 may cause the processing resource 504 to continue exchange of data frames between the AP and the client device without offering the wireless communication feature, wherein the AP continues to offer the wireless communication feature to another client device of the plurality of client devices that is not facing the performance issue related to the wireless communication feature. In some examples, the instructions 507 may include instructions which when executed by the processing resource 504 may cause the processing resource 504 to perform one or more of the operations that are intended to be performed by the AP.

In some examples, the computing system 500 may be a supervisory management device such as the controller or the backend management system which stores the instructions 509. The instructions 509 may include instructions which when executed by the processing resource 504 may cause the processing resource 504 to receive an alert from the AP indicating that a client device of the plurality of client devices is facing a performance issue related to a wireless communication feature. Further, the instructions 509 may include instructions which when executed by the processing resource 504 may cause the processing resource 504 to transmit, upon receiving the alert, a wireless action to the AP, the wireless action comprising an instruction for the AP to disable the wireless communication feature for the client device. In some examples, the one or more of the instructions 509 when executed by the processing resource 504 may cause the processing resource 504 to perform one or more of the operations that are intended to be performed by the supervisory management device.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, programmable logic arrays (PLAs), Programming Array Logics (PALs), complex programmable logic devices (CPLDs), FPGAs, logical components, software routines or other mechanisms might be implemented to make up a circuit. In an implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the computing system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise.

What is claimed is:

1. A method comprising:
    determining, by an access point (AP), whether a client device of a plurality of client devices communicatively coupled to the AP is experiencing a performance issue related to a wireless communication feature based on data frames exchanged between the AP and the client device after the client device is connected to the AP, wherein the wireless communication feature comprises orthogonal frequency-division multiple access (OFDMA), multi-user multiple-input multiple-output (MU-MIMO), or aggregated media access control (MAC) protocol data unit (AMPDU);
    disabling, by the AP, the wireless communication feature for the client device, the disabling preventing the wireless communication feature between the AP and the client device absent disabling the wireless communication feature between the AP and another client device; and
    continuing, by the AP, exchange of data frames with the client device without offering the wireless communication feature to the client device, wherein the AP continues to offer the wireless communication feature to another client device of the plurality of client devices that is not facing the performance issue related to the wireless communication feature.

2. A method comprising:
    determining, by an access point (AP), whether a client device of a plurality of client devices communicatively coupled to the AP is experiencing a performance issue related to a wireless communication feature based on data frames exchanged between the AP and the client device after the client device is connected to the AP;
    disabling, by the AP, the wireless communication feature for the client device, wherein the wireless communication feature comprises one or more of an aggregated media access control (MAC) Protocol Data Unit (AMPDU), orthogonal frequency-division multiple access (OFDMA), multi-user multiple-input multiple-output (MU-MIMO), aggregated MAC service data unit (AMSDU), high throughput (HT), very high throughput (VHT), high efficiency (HE), Wi-Fi multimedia (WMM), or legacy rates; and
    continuing, by the AP, exchange of data frames with the client device without offering the wireless communication feature to the client device, wherein the AP continues to offer the wireless communication feature to another client device of the plurality of client devices that is not facing the performance issue related to the wireless communication feature.

3. The method of claim 1, further comprising creating, by the AP, an alert defining one or more of an identity of the client device, a basic service set identifier (BSSID) of the AP, or information of the wireless communication feature related to the performance issue.

4. The method of claim 3, wherein the identity of the client device comprises a MAC address of the client device.

5. The method of claim 3, further comprising:
    in response to determining that the client device is experiencing the performance issue:
        transmitting, by the AP, the alert to a supervisory management device; and
        receiving, by the AP, a wireless action from the supervisory management device to disable the wireless communication feature for the client device, wherein the wireless communication feature is disabled for the client device in response to receiving the wireless action.

6. The method of claim 5, wherein the wireless action comprises a predefined lifetime for which the wireless action remains active.

7. The method of claim 5, further comprising enabling, by the AP, the wireless communication feature for the client device upon expiry of the wireless action.

8. A system comprising:
an AP communicatively coupled to a plurality of client devices;
a supervisory management device communicatively coupled to the AP, the supervisory management device comprising:
a processing resource; and
a machine-readable storage medium accessible by the processing resource and storing executable instructions, wherein the processing resource executes the instructions to:
receive an alert from the AP indicating that a client device of the plurality of client devices is facing a performance issue related to a wireless communication feature, wherein the wireless communication feature comprises orthogonal frequency-division multiple access (OFDMA), multi-user multiple-input multiple-output (MU-MIMO), or aggregated media access control (MAC) protocol data unit (AMPDU); and
transmit, upon receiving the alert, a wireless action to the AP, the wireless action comprising an instruction for the AP to disable the wireless communication feature for the client device; and
wherein the AP, based on the wireless action, is configured to disable the wireless communication feature for the client device and continue to offer the wireless communication feature to another client device of the plurality of client devices that is not facing the performance issue related to the wireless communication feature, and
wherein the wireless action prevents the wireless communication feature between the AP and the client device absent preventing the wireless communication feature between the AP and another client device.

9. The system of claim 8, wherein the client device is communicatively coupled to the AP via a Service Set Identifier (SSID) advertised by the AP.

10. The system of claim 9, wherein the processing resource executes one or more of the instructions to transmit the wireless action to other APs advertising the SSID.

11. The system of claim 9, wherein the processing resource executes one or more of the instructions to:
determine whether the client device is experiencing the performance issue related to the wireless communication feature with another AP deployed in the system; and
in response to determining that the client device is facing the performance issue related to the wireless communication feature with the another AP, transmit the wireless action to access points advertising the SSID.

12. The system of claim 8, wherein the AP creates the alert defining one or more of an identity of the client device, a BSSID of the AP, or information of the wireless communication feature.

13. The system of claim 8, wherein the supervisory management device stores, based on the alert, a log comprising information about the client device and the wireless communication feature causing performance issue.

14. The system of claim 8, wherein the processing resource executes one or more of the instructions to create the wireless action defining one or more of an identity of the client device, a BSSID of the AP, information of the wireless communication feature to be disabled, or a predefined lifetime for which the wireless action remains active.

15. The system of claim 11, wherein the AP enables the wireless communication feature for the client device upon expiry of the wireless action.

16. A non-transitory machine-readable storage medium storing instructions executable by a processing resource, the instructions, when executed by the processing resource, cause the processing resource to:
determine whether a client device of a plurality of client devices communicatively coupled to an AP is experiencing a performance issue related to a wireless communication feature based on data frames exchanged between the AP and the client device after the client device is connected to the AP,
wherein the wireless communication feature comprises orthogonal frequency-division multiple access (OFDMA), multi-user multiple-input multiple-output (MU-MIMO), or aggregated media access control (MAC) protocol data unit (AMPDU);
disable the wireless communication feature for the client device, the disabling preventing the wireless communication feature between the AP and the client device absent disabling the wireless communication feature between the AP and another client device; and
continue exchange of data frames with the client device without offering the wireless communication feature to the client device, wherein the AP continues to offer the wireless communication feature to another client device of the plurality of client devices that is not facing the performance issue related to the wireless communication feature.

17. The non-transitory machine-readable storage medium of claim 16, wherein the instructions, when executed by the processing resource, cause the processing resource to create an alert defining one or more of an identity of the client device, a basic service set identifier (BSSID) of the AP, or information of the wireless communication feature related to the performance issue.

18. The non-transitory machine-readable storage medium of claim 17, wherein the instructions, when executed by the processing resource, cause the processing resource to:
in response to determining that the client device is experiencing the performance issue:
transmit the alert to a supervisory management device; and
receive a wireless action from the supervisory management device to disable the wireless communication feature for the client device, wherein the wireless communication feature is disabled in response to receiving the wireless action.

19. The non-transitory machine-readable storage medium of claim 18, wherein the instructions, when executed by the processing resource, cause the processing resource to enable the wireless communication feature for the client device upon expiry of the wireless action.

20. The method of claim 1, wherein the disabling comprises removing an entry from a list of features supported by the AP for the client device, the entry corresponding with the wireless communication feature.

\* \* \* \* \*